US012108870B2

(12) United States Patent
Bloch et al.

(10) Patent No.: US 12,108,870 B2
(45) Date of Patent: Oct. 8, 2024

(54) ORAL CARE REFILL HEAD AND ORAL CARE KIT INCLUDING THE SAME

(71) Applicant: Colgate-Palmolive Company, New York, NY (US)

(72) Inventors: Brian Bloch, Hillsborough, NJ (US); Takahide Okai, Highland Park, NJ (US); John Gatzemeyer, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 628 days.

(21) Appl. No.: 17/302,600

(22) Filed: May 7, 2021

(65) Prior Publication Data

US 2021/0251374 A1 Aug. 19, 2021

Related U.S. Application Data

(62) Division of application No. 15/838,970, filed on Dec. 12, 2017, now Pat. No. 11,033,096.

(51) Int. Cl.
*A61C 17/16* (2006.01)
*A46B 5/00* (2006.01)
(Continued)

(52) U.S. Cl.
CPC .............. *A46B 5/0095* (2013.01); *A46B 9/04* (2013.01); *A61C 17/005* (2013.01); *A61C 17/16* (2013.01);
(Continued)

(58) Field of Classification Search
CPC ....... A61C 17/005; A61C 17/16; A61C 17/22; A61C 17/222; A61C 2202/00–02
See application file for complete search history.

(56) References Cited

U.S. PATENT DOCUMENTS

| 1,626,127 A | 4/1927 | Wayne |
| 1,992,770 A | 2/1935 | Rathbun |

(Continued)

FOREIGN PATENT DOCUMENTS

| CN | 102551907 | 7/2012 |
| CN | 204411011 | 6/2015 |

(Continued)

OTHER PUBLICATIONS

Machine Translation of CN102551907A. Accessed via Google Patents on Oct. 18, 2023 (Year: 2012).*
(Continued)

*Primary Examiner* — Edward Moran

(57) ABSTRACT

An oral care refill head and an oral care kit comprising the same. The oral care refill head may include a sleeve portion, a head portion, and an elastomeric prophy cup. The sleeve portion may have an inner surface that defines an internal cavity for receiving a portion of a stem of an oral care implement handle therein so that the oral care refill head can be repetitively attached to and detached from the oral care implement handle. The elastomeric prophy cup may comprise an outer surface that forms at least a portion of a peripheral side surface of the head portion. The elastomeric prophy cup may be formed by injection molding an elastomeric material onto a support portion of the head portion. The oral care refill head may be packaged together with a store of an anti-sensitivity oral care material to form a kit.

18 Claims, 9 Drawing Sheets

(51) Int. Cl.
*A46B 9/04* (2006.01)
*A61C 17/00* (2006.01)
*A61C 17/22* (2006.01)
*A61C 17/34* (2006.01)

(52) U.S. Cl.
CPC ........ *A61C 17/3481* (2013.01); *A61C 17/222* (2013.01); *A61C 2202/00* (2013.01)

(56) References Cited

U.S. PATENT DOCUMENTS

| | | | |
|---|---|---|---|
| 3,509,630 | A | 5/1970 | Spinello |
| 3,579,835 | A | 5/1971 | Levenson |
| 4,544,356 | A | 10/1985 | Gardella et al. |
| 5,160,263 | A | 11/1992 | Meller et al. |
| 5,380,202 | A | 1/1995 | Brahler |
| 5,584,690 | A | 12/1996 | Maassarani |
| 5,683,247 | A | 11/1997 | Bailey |
| 6,257,886 | B1 | 7/2001 | Warner |
| 6,821,119 | B2 | 11/2004 | Shortt et al. |
| 6,905,335 | B2* | 6/2005 | Fischer .................. A61C 3/025 433/215 |
| 7,160,108 | B2 | 1/2007 | Jaffe |
| D612,611 | S | 3/2010 | Brown, Jr. et al. |
| 7,814,603 | B2 | 10/2010 | Gavney, Jr. |
| 7,877,833 | B2 | 2/2011 | Gavney, Jr. |
| 7,958,589 | B2 | 6/2011 | Braun et al. |
| 8,777,615 | B2 | 7/2014 | Hayman et al. |
| 8,784,102 | B1 | 7/2014 | Kumar |
| 8,821,161 | B2 | 9/2014 | Mansour et al. |
| 8,851,779 | B2 | 10/2014 | Jimenez et al. |
| 9,101,204 | B2* | 8/2015 | Buchholz .................. A46B 9/04 |
| 9,320,580 | B2* | 4/2016 | Montgomery ....... A61C 19/066 |
| 9,427,076 | B2 | 8/2016 | Jimenez et al. |
| 9,770,316 | B1* | 9/2017 | Speed ...................... A61D 5/00 |
| 2004/0014004 | A1 | 1/2004 | Garrison |
| 2008/0160482 | A1 | 7/2008 | Jensen |
| 2008/0233054 | A1* | 9/2008 | Kleinberg ................ A61K 6/52 424/48 |
| 2021/0077239 | A1* | 3/2021 | Shen ........................ A61K 8/22 |

FOREIGN PATENT DOCUMENTS

| | | |
|---|---|---|
| EP | 0433773 | 6/1991 |
| WO | 2012/087323 | 6/2012 |

OTHER PUBLICATIONS

International Search Report and the Written Opinion of the International Searching Authority issued in International Application PCT/US2018/063363 mailed Apr. 17, 2019.

\* cited by examiner

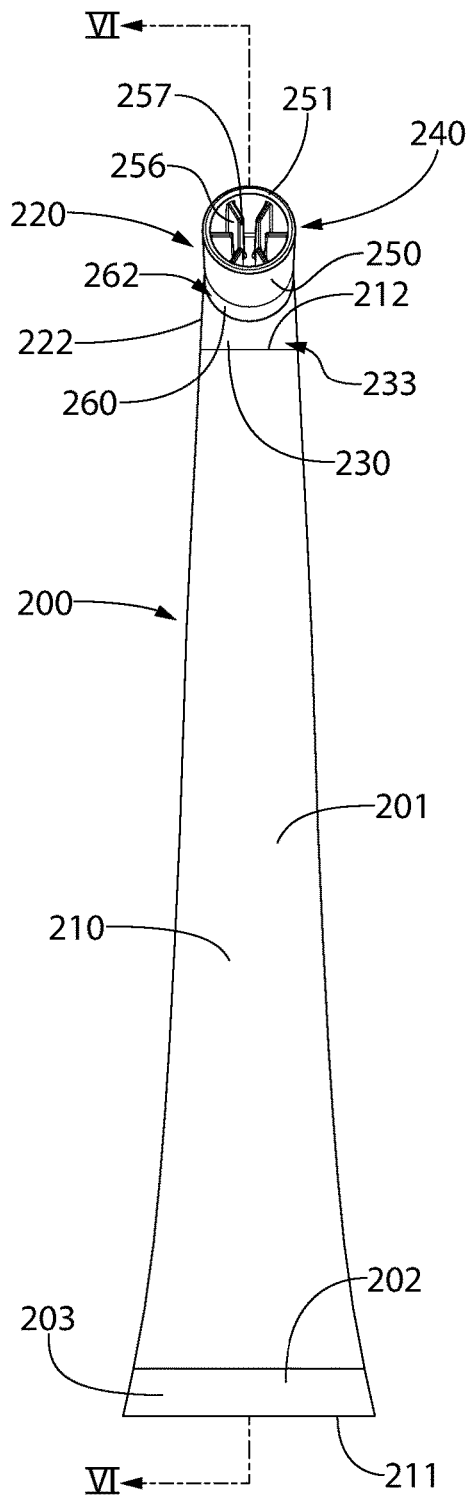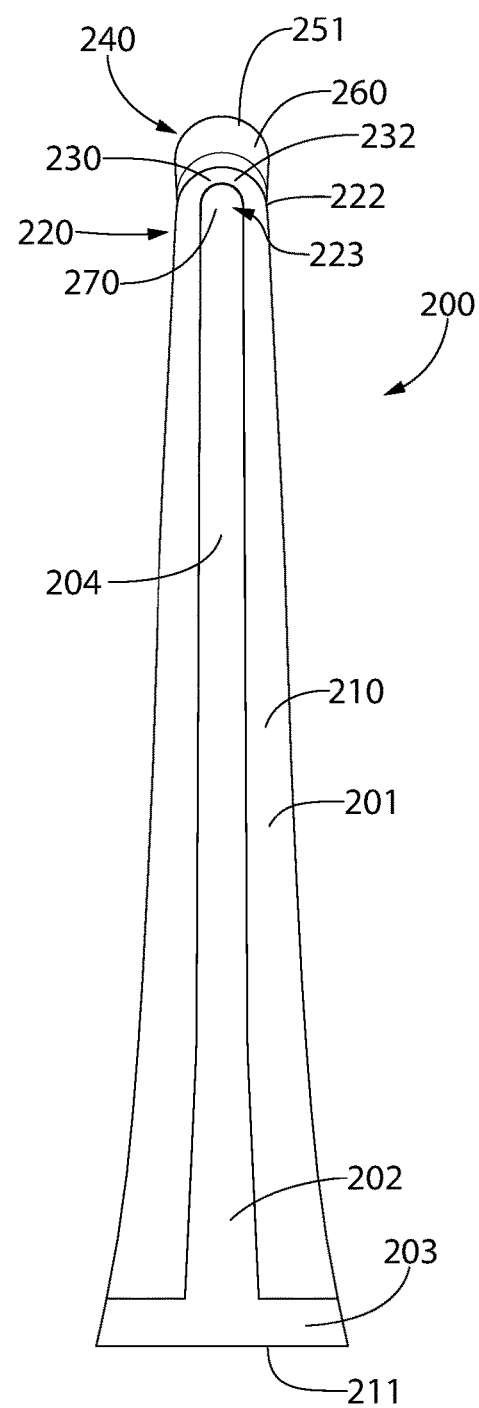
FIG. 4
FIG. 5

ORAL CARE REFILL HEAD AND ORAL CARE KIT INCLUDING THE SAME

CROSS-REFERENCE TO RELATED APPLICATIONS

The present application is a divisional of U.S. patent application Ser. No. 15/838,970, filed Dec. 12, 2017, the entirety of which is incorporated herein by reference.

BACKGROUND

Myriad implements and devices for maintaining oral health are known. For example, toothbrushes of both the manual and powered variety, floss, dentifrices, applicators, agents, and the like are all known to provide different benefits in the oral cavity. One of the reasons that there are so many different types of implements for maintaining oral health is that different implements are specifically suited to remedy different oral health ailments. For example, application of various oral care agents into the oral cavity may be more effective depending on the structure, shape, and/or material of the component that is used to directly apply the agent into the oral cavity. Thus, it may also be beneficial to pair a specific oral care agent with a specific oral care device that is best suited for effectively applying that oral care agent onto the oral cavity. Moreover, there is a continuing desire to improve the manufacturing efficiency of the various types of oral care implements while maintaining effectiveness and comfort during use. These and other needs are met by the invention described herein below.

BRIEF SUMMARY

The present invention is directed to an oral care refill head comprising a sleeve portion, a head portion, and an elastomeric prophy cup. The sleeve portion may have an inner surface that defines an internal cavity for receiving a portion of a stem of an oral care implement handle therein so that the oral care refill head can be repetitively attached to and detached from the oral care implement handle. The elastomeric prophy cup may comprise an outer surface that forms at least a portion of a peripheral side surface of the head portion. The elastomeric prophy cup may be formed by injection molding an elastomeric material onto a support portion of the head portion. The oral care refill head may be packaged together with a store of an anti-sensitivity oral care material to form a kit.

In one aspect, the invention may be an oral care refill head comprising: a sleeve portion extending from a proximal end to a distal end, the sleeve portion comprising an inner surface that defines an internal cavity that extends along a sleeve axis from an open bottom end at the proximal end of the sleeve portion to a closed top end, the internal cavity configured to receive an attachment portion of a stem of an oral care implement handle; a head portion at the distal end of the sleeve portion, the head portion comprising a front surface and a peripheral side surface; and an elastomeric prophy cup comprising an elastomeric cup portion and an elastomeric base portion, the elastomeric base portion comprising an outer surface that forms at least a first portion of the peripheral side surface of the head portion, the elastomeric cup portion of the prophy cup extending along a prophy cup axis.

In another aspect, the invention may be an oral care kit comprising: an oral care refill head comprising: a sleeve portion configured to be detachably coupled to an oral care implement handle; a head portion at the distal end of the sleeve portion; and an elastomeric prophy cup on the head portion; a store of an anti-sensitivity oral care material; and a package containing the oral care refill head and the store of the anti-sensitivity oral care material.

In yet another aspect, the invention may be an oral care kit comprising: a handle comprising a vibration generating device; an oral care refill head comprising: a sleeve portion configured to be detachably coupled to the oral care implement handle; and a head portion having an elastomeric prophy cup extending therefrom; a store of an oral care material; and a package containing the handle, the oral care refill head, and the store of the oral care material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a front view of the oral care refill head of FIG. 1;

FIG. 5 is a rear view of the oral care refill head of FIG. 1;

DETAILED DESCRIPTION

Figure 1:
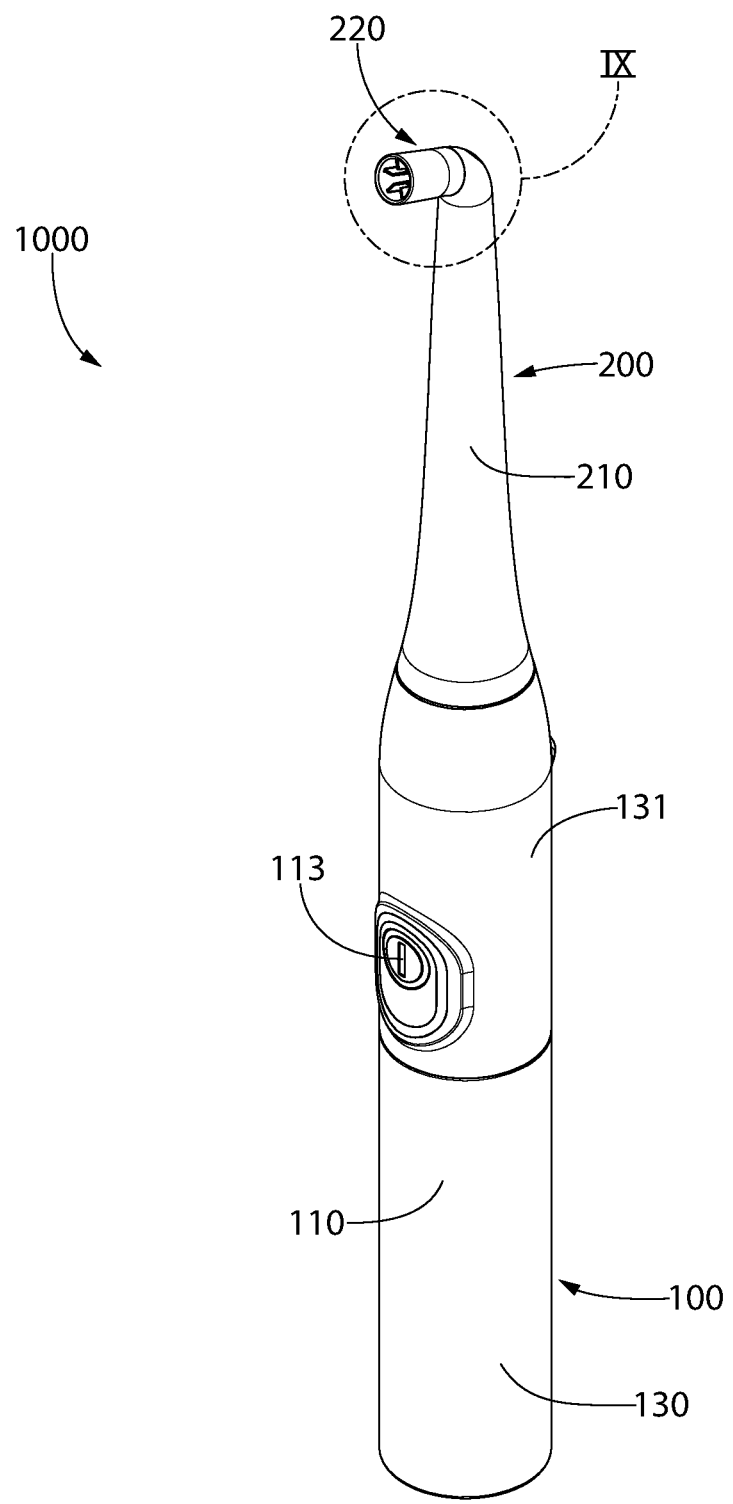
FIG. 1 is a front perspective view of an oral care implement having an oral care refill head and an oral care implement handle in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 2:
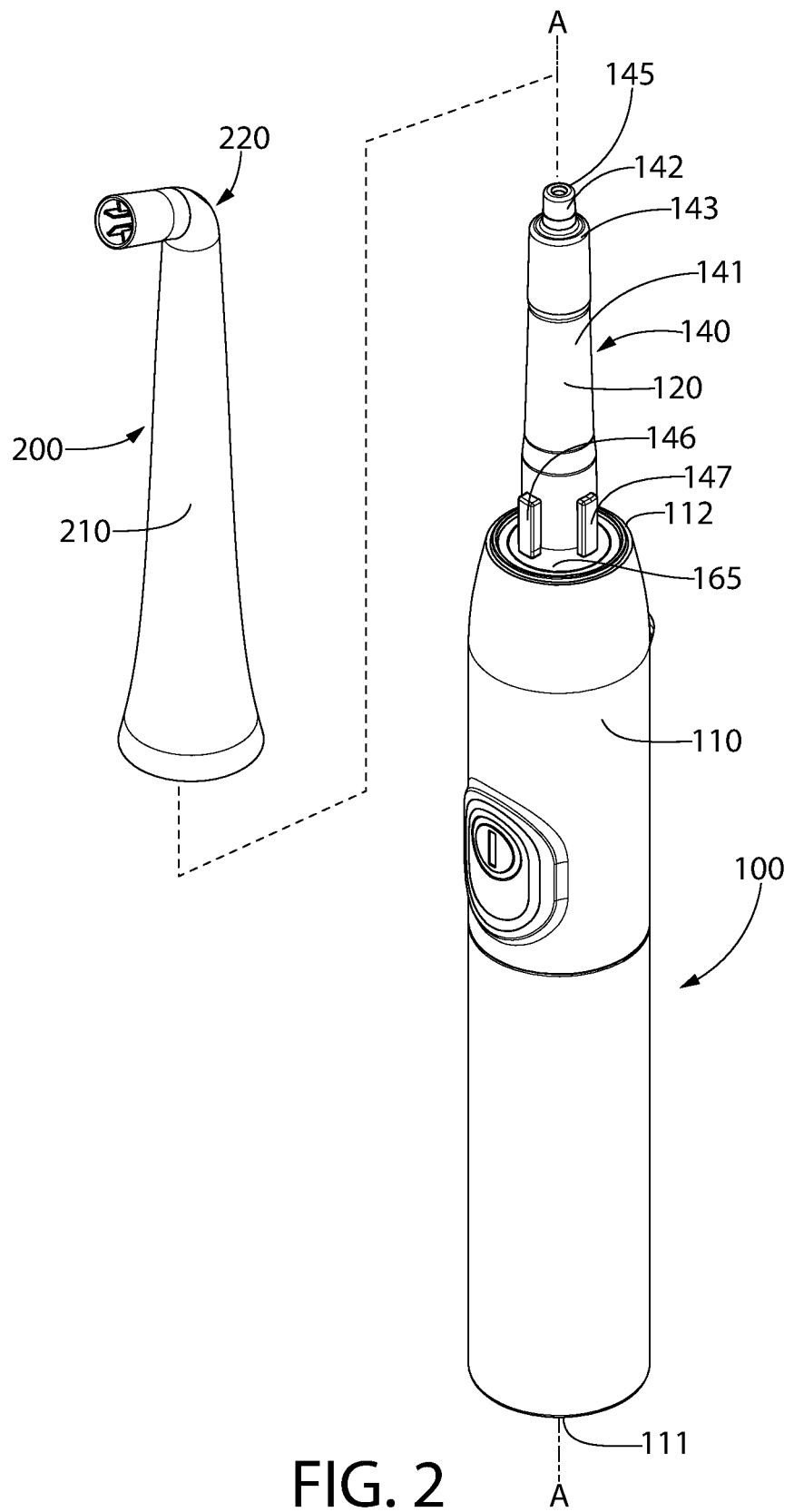
FIG. 2 is a front perspective view of the oral care implement of FIG. 1 illustrating the oral care refill head detached from the oral care implement refill handle.
Figure 3:
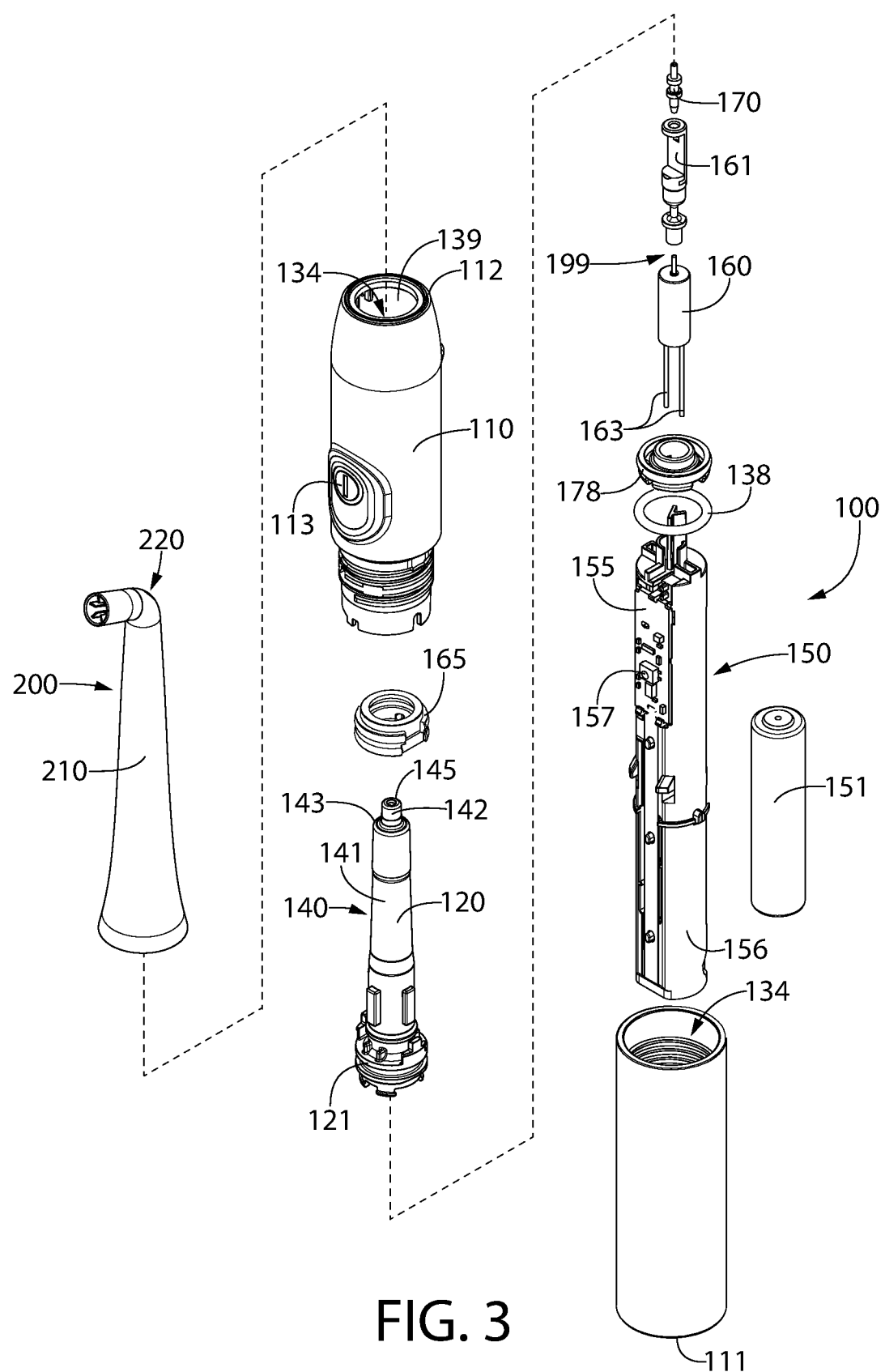
FIG. 3 is an exploded front perspective view of the oral care implement of FIG. 1.

Referring to FIGS. 1-3 concurrently, an oral care implement 1000 is illustrated in accordance with an embodiment of the present invention. The oral care implement 1000 generally comprises an oral care implement handle 100 and an oral care refill head 200. The oral care refill head 200 is detachably coupled to the oral care implement handle 100. Thus, the oral care refill head 200 may be repetitively coupled to and detached from the oral care implement handle 100 as desired. This enables the oral care implement handle 100 to be kept and reused while the oral care refill head 200 is replaced with a new refill head when the oral care refill head 200 becomes worn or otherwise requires replacement. This is desirable because often the handle contains or otherwise houses the expensive electronic components of an oral care implement 1000. The handle and the electronic components usually long outlast the refill head 200. Thus, by permitting the oral care refill head 200 to be detached from the oral care implement handle 100 and replaced with another refill head, the same handle can be used with different refill heads 200, thereby prolonging the life of the oral care implement 1000. Furthermore, this also enables one type of oral care refill head to be replaced with a different type of oral care refill head that is specifically suited to remedying an oral health condition and it allows for different individuals to use the same oral care implement handle 100 with their own oral care refill head 200.

In the exemplified embodiment, the oral care implement 1000 is a powered or electric oral care device (including a vibration generating device 199 that vibrates the head of the oral care refill head 200 or portions thereof). The specific function or purpose of the oral care implement 1000 may be dictated based on the structure and components of the oral care refill head 200. In certain embodiments of the invention described herein, the oral care refill head 200 comprises an elastomeric prophy cup that is intended for tooth polishing or for applying a specific type of an oral care material onto a user's teeth and oral soft tissue surfaces. Of course, the invention is not to be so limited in all embodiments and in other embodiments the oral care implement 1000 may be a manual toothbrush, a tongue scraper, a gum and soft tissue cleanser, a water pick, an interdental device, a tooth polisher, a specially designed ansate implement having tooth engaging elements, or any other type of implement that is commonly used for oral care.

The oral care implement handle 100 extends along a longitudinal axis A-A and comprises a gripping portion 110 extending from a proximal end 111 to a distal end 112 and a stem 120 that extends or protrudes from the distal end 112 of the gripping portion 110. In the exemplified embodiment, the stem 120 is not directly attached to the gripping portion 110, but rather it extends through an opening 139 in the distal end 112 of the gripping portion 111. Thus, stating that the stem 120 extends from the distal end 112 of the gripping portion 111 does not require a direct coupling between the stem 120 and the distal end 112 of the gripping portion 111, but merely requires that the stem 120 extends in the longitudinal direction beyond the distal end 112 of the gripping portion 110. Of course, the stem 120 may be directly coupled to and extend directly from the distal end 112 of the gripping portion 110 in some embodiments. The distal end 112 of the gripping portion 110 forms a shoulder that circumferentially surrounds the stem 120 as it protrudes form the distal end 112 of the gripping portion 110.

In the exemplified embodiment, the gripping portion 110 of the oral care implement handle 100 comprises an actuator 113 on its outer surface that enables a user to power the oral care implement 1000 on and off. In the exemplified embodiment, the actuator 113 is located on a front surface of the gripping portion 110 of the oral care implement handle 100. The actuator 113, when depressed, engages a switch that powers the vibration generating device 199. The vibration generating device 100 comprises a motor 160 and an eccentric 161 and when the vibration generating device 199 is activated/powered on, the motor 160 and the eccentric 161 rotate, thereby generating vibrations that are transmitted to the oral care refill head 200 to enhance a user's cleaning experience. Thus, the actuator 113 is configured to activate and deactivate the vibration generating device 199 (which may comprise the motor 160, the eccentric 161, and a power source) that is housed within the oral care implement handle 100.

In the exemplified embodiment, the gripping portion 110 of the oral care implement handle 100 comprises a first part 130 and a second part 131 that are detachably coupled together. The first and second parts 130, 131 may be detachably coupled together via mating screw threads, interference fit, boss/detent, or the like. Of course, it is possible in other embodiments for the gripping portion 110 to be formed from a single unitary component. However, the two-part gripping portion 110 may make it easier to assemble the various components of the oral care implement 1000 together. When coupled together, the first and second parts 130, 131 collectively define a handle cavity 134. An O-ring 138 (or other type of gasket) may be provided between the first and second parts 130, 131 of the gripping portion 110 to seal the interface of the first and second parts 130, 131 so that water and other fluids cannot pass into the handle cavity 134 during use of the oral care implement 1000 or otherwise.

An electronics component 150 is housed within the handle cavity 134. The electronics component 150 comprises a circuit board 155 comprising the electronic circuitry necessary for proper operation of the oral care implement 1000, including processor(s), memory device(s), switch(es), resistors, capacitors, and the like. The electronics component 150 also comprises a chassis 156 that holds a power source 151, which is shown as a battery exploded away from the electronics component 150 in FIG. 3. Of course, more than one battery may be used. In the exemplified embodiment, the circuit board 155 is coupled to one side of the chassis 156 and the batteries are housed within a compartment located on the opposite side of the chassis 156. Of course, other arrangements are possible in other embodiments. Generally, the electronics component 150 is configured to be coupled to the motor 160 to control operation of the motor 160 such that when a switch 157 is closed the motor 160 is operating and when the switch 157 is open the motor 160 is not operating. The opening and closing of the switch 157 may be controlled via actuation of the actuator 113.

A gasket 165 is provided at the junction of the stem 120 and the gripping portion 110 to prevent the ingress of liquids at the location of the junction of those two components. The gasket 165 is coupled to the stem 120 so as to surround a portion of a lower portion 121 of the stem 120. Furthermore, the gasket 165 presses against the inner surface of the second component 131 of the gripping portion 110 to maintain the stem 120 in position without the stem 120 falling into the handle cavity 134. A portion of the gasket 165 may be visible when the oral care implement handle 100 is fully assembled with the oral care refill head 200 detached therefrom, as best illustrated in FIG. 2. A second gasket 178 may be coupled to another portion of the lower portion 121 of the stem 120 and collectively the gasket 165 and the second gasket 178 operate to prevent the ingress of fluids. Of course, one or both of the gasket 165 and the second gasket 178 may be omitted in alternative embodiments.

The stem 120 comprises an inner surface that defines an inner cavity (not shown) that houses the motor 160, the eccentric 161, a guide pin 170, and a coupling member 162 that couples the motor 160 to the eccentric 161. The motor 160, the eccentric 161, and the power source 151 (or various other combinations of the components housed within the stem 120) may be referred to herein collectively as the vibration generating device 199 because these components are coupled together and operate collectively to impart vibrations to a head portion 220 of the oral care refill head 200. The motor 160 is electrically coupled to the electronics component 150 and the power source 151 via conductive wires 163 to control operation of the motor 160.

The guide pin 170 may be partially embedded within a top region of the stem 120 and it may be inserted into an aperture or opening in a top end of the eccentric 161. When the motor 160 is activated, the eccentric 161 is caused to rotate due to its coupling to the motor 160. Due to the off-center rotational axis of the eccentric 161 relative to a central axis of the motor 160 and due to the coupling between the eccentric 161 and the guide pin 170 that is partially embedded within the stem 120, rotation of the eccentric 161 imparts vibrations to the head portion 220 of the oral care refill head 200.

The stem 120 is the portion of the oral care implement handle 100 that the oral care refill head 200 is configured to be detachably coupled to. The stem 120 comprises the lower portion 121 and an attachment portion 140. When the oral care implement handle 100 is fully assembled, the lower portion 121 of the stem 120 is located within the cavity 134 of the gripping portion 110 and the attachment portion 140 of the stem 120 protrudes from the shoulder at the distal end 112 of the gripping portion 110. The attachment portion 140 of the stem 120 can then be inserted into an internal cavity of the oral care refill head 200 to couple the oral care refill head 200 to the oral care implement handle 100.

In the exemplified embodiment, the attachment portion 140 of the stem 120 comprises a base portion 141 and a post 142. Of course, the post 142 may be omitted in some embodiments so long as the attachment portion 140 is configured for insertion into the internal cavity of the oral care refill head 200 as described herein. The base portion 141 protrudes from the shoulder and terminates in a distal surface 143 that forms a second shoulder. The post 142 protrudes from the second shoulder and terminates in a closed distal end 145 that forms a free end of the attachment portion 140 of the stem 120. Although the post 142 has a circular cross-sectional shape in the exemplified embodiment, other shapes are possible for the post 142.

In the exemplified embodiment, various alignment and locking protuberances 146, 147 extend from an outer surface of the base portion 141 of the attachment portion 140 of the stem 120. The alignment and locking protuberances 146, 147 may be used on the base portion 141 to ensure proper alignment between the oral care refill head 200 and the oral care implement handle 100 and to facilitate locking of the oral care refill head 200 to the oral care implement handle 100. The size, shape, structure, depth, thickness, length, or the like of the alignment and/or locking protuberances 146, 147 are not intended to be limiting of the present invention in all embodiments.

In the exemplified embodiment, the stem 120 is an integrally formed structure that includes the lower portion 121 and the attachment portion 140 (with the attachment portion 140 comprising the base portion 141 and the post 142). Thus, the stem 120 may be a monolithic component formed from a rigid material, such as plastic or the like. In some embodiments the stem 120 is formed via injection molding, although this manufacturing technique is not required in all embodiments.

Referring to FIGS. 4-8 concurrently, the oral care refill head 200 will be described in detail. The oral care refill head 200 comprises a sleeve portion 210 and a head portion 220. The sleeve portion 210 is the portion that fits over the stem 120 of the oral care implement handle 100 to couple the oral care refill head 200 to the oral care implement handle 100. The head portion 220 includes one or more elements that are configured for cleaning and/or polishing and/or applying an oral care material onto a user's oral cavity surfaces such as the teeth, gums, and/or inner check surfaces. In the exemplified embodiment, the element of the oral care refill head 200 that is used for cleaning the oral cavity is a prophy cup.

The head portion 220 of the oral care refill head 200 comprises a front surface 221, a rear surface 223, and a peripheral side surface 222 extending between the front and rear surfaces 221, 223. The sleeve and head portions 210, 220 may be integrally formed as a single unitary structure. The sleeve and head portions 210, 220 may comprise a base or body portion formed of a hard plastic material such as polypropylene or the like and an elastomeric material may be overmolded onto the base or body portion, as described in more detail herein below.

The sleeve portion 210 of the oral care refill head 200 extends from a proximal end 211 to a distal end 212 and the head portion 220 is coupled to or extends from the distal end 212 of the sleeve portion 210. Furthermore, the sleeve portion 210 of the oral care refill head 200 comprises an inner surface 213 that defines an internal cavity 214. The internal cavity 214 of the sleeve portion 210 of the oral care refill head 200 extends along a sleeve axis B-B from an open bottom end 215 at the proximal end 211 of the sleeve portion 210 to a closed top end 216. The internal cavity 214 is configured to receive the attachment portion 140 of the stem 120 of the oral care implement handle 100.

The sleeve portion 210 of the oral care refill head 200 comprises a main body 201 formed of a rigid material and an elastomeric component 202 overmolded onto the main body 201. Specifically, the elastomeric component 202 comprises a first portion 203 located adjacent to the proximal end 211 of the sleeve portion 210 and a second portion 204 extending from the first portion 203 to the head portion 220 of the oral care refill head 200. The first portion 203 of the elastomeric component 202 is an annular portion of the elastomeric component 202 that circumferentially surrounds a lower portion of the main body 201. The second portion 204 of the elastomeric component 202 is elongated in a direction of the sleeve axis B-B from the first portion 203 of the elastomeric component 202 to the head portion 220 of the oral care refill head 200. Each of the first and second portions 203, 204 of the elastomeric component 202 are disposed within a recess formed into the main body 201 so that the outer surface of the elastomeric component 202 is flush with the outer surface of the main body 201. Thus, there are no stepped surfaces between the elastomeric component 202 and the main body 201, but rather each transitions into the other in a smooth and flush manner.

The oral care refill head 200 comprises an elastomeric prophy cup 240. The elastomeric prophy cup 240 comprises an elastomeric cup portion 250 and an elastomeric base portion 260. The elastomeric prophy cup 240 is formed of an elastomeric material such as a thermoplastic elastomer or the like. The elastomeric prophy cup 240 is a unitary and integral structure that comprises both the elastomeric cup portion 250 and the elastomeric base portion 260.

The head portion 220 of the oral care refill head 200 comprises a support portion 230 formed of a hard plastic and at least a portion of the elastomeric base portion 260 of the elastomeric prophy cup 240. The support portion 230 of the head portion 220 is formed integrally with the main body 201 of the sleeve portion 210. The support portion 230 comprises a front surface 231, a rear surface 232, and an outer surface 233. The elastomeric base portion 260 of the elastomeric prophy cup 240 comprises a front surface 261 and an outer surface 262.

The front surface 261 of the elastomeric base portion 260 of the elastomeric prophy cup 240 forms at least a portion of the front surface 221 of the head portion 220 of the oral care refill head 200. The outer surface 262 of the elastomeric base portion 260 of the elastomeric prophy cup 240 forms a first portion of the peripheral side surface 222 of the head portion 220 and the outer surface 233 of the support portion 230 forms a second portion of the peripheral side surface 222 of the head portion 220. Each of the first and second portions of the peripheral side surface 222 of the head portion 220 circumscribe the head portion. Furthermore, the outer surface 233 of the support portion 230 and the outer surface 262 of the elastomeric base portion 260 are flush such that neither the support portion 230 nor the elastomeric base portion 260 protrudes radially beyond the other. Rather, the outer surface 233 of the support portion 230 and the outer surface 262 of the elastomeric base portion 260 form a smooth interface.

Figure 6:
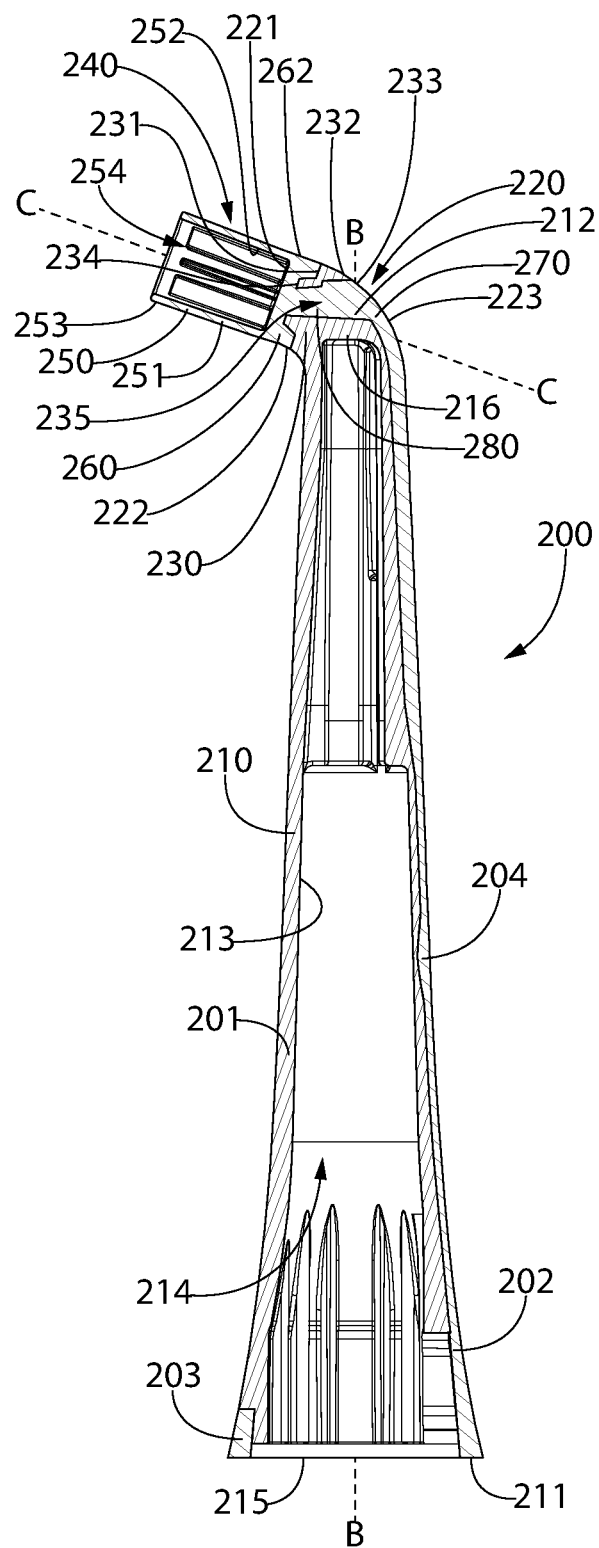
FIG. 6 is a cross-sectional view taken along line VI-VI of FIG. 4.
Figure 7:
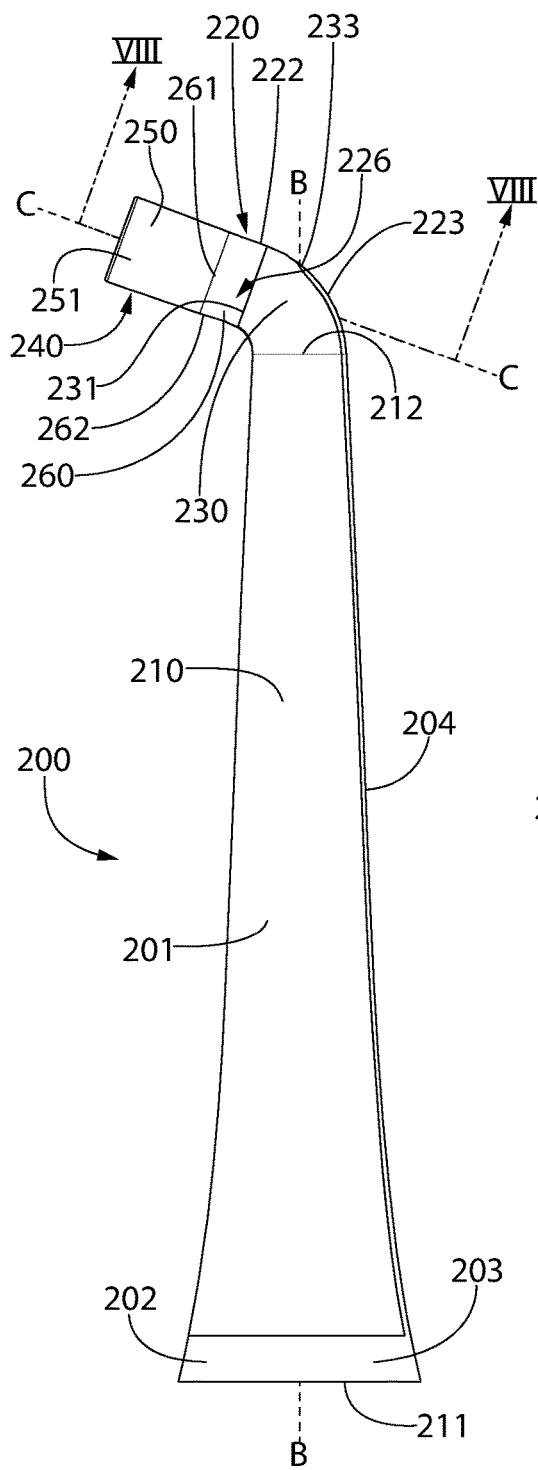
FIG. 7 is a side view of the oral care refill head of FIG. 1.
Figure 8:
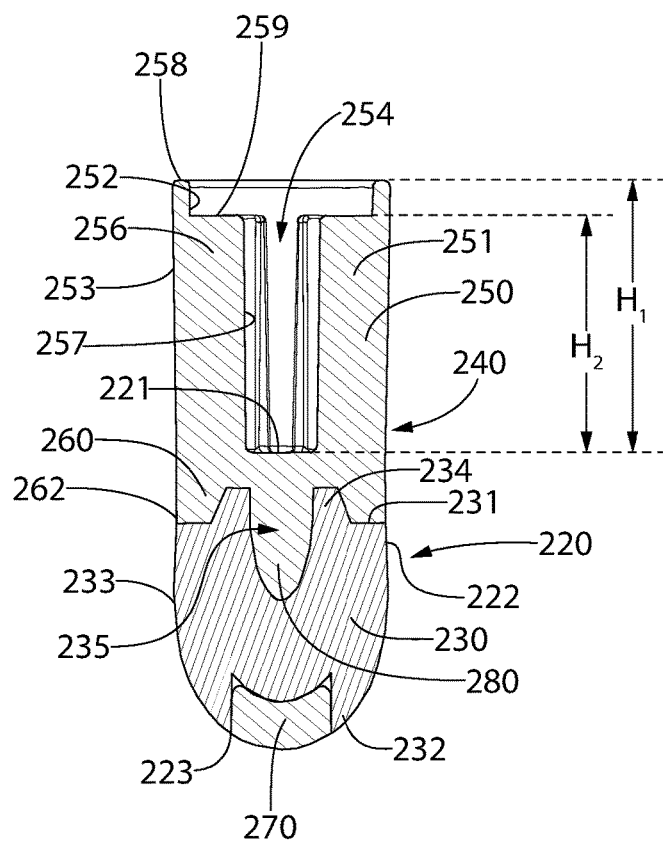
FIG. 8 is a cross-sectional view taken along line VIII-VIII of FIG. 7.

As best seen in FIGS. 6 and 8, the support structure 230 comprises a protuberance 234 that extends into the elastomeric base portion 260 of the elastomeric prophy cup 240. The protuberance 234 extends upwardly from the front surface 231 of the support structure 230. The elastomeric base portion 260 of the elastomeric prophy cup 240 covers an entirety of the front surface 231 of the support structure 230 such that no portion of the front surface 231 of the support structure 230 is exposed.

The support structure 230 comprises a through hole 235 extending through the support structure 230 from the front surface 231 of the support structure 230 to the rear surface 232 of the support structure 230. The head portion 220 of the oral care refill head 200 comprises an elastomeric pad 270 that forms at least a portion of the rear surface 223 of the head portion 220. The elastomeric pad 270 is integrally connected to the elastomeric prophy cup 240 by an elastomeric post 280 that extends through the through hole 235 in the support structure 230.

In the exemplified embodiment the elastomeric cup portion 250, the elastomeric base portion 260, the elastomeric pad 270, and the elastomeric post 280 are integrally formed from a single unitary mass of elastomeric material. In fact, the single unitary mass of elastomeric material also comprises the first and second portions 203, 204 of the elastomeric component 202 that is overmolded onto the main body 201 of the sleeve portion 210 of the oral care refill head 200. Thus, a single injection molded shot of an elastomeric material forms the elastomeric cup portion 250, the elastomeric base portion 260, the elastomeric pad 270, the elastomeric post 280, and the elastomeric component 202 as a unitary mass of elastomeric material. As a result, the elastomeric prophy cup 240 is fixed to the support portion 230 such that the elastomeric prophy cup 240 cannot be readily detached from the support portion 230. Thus, in certain embodiments the elastomeric prophy cup 240 is not replaceable without replacing the entire oral care refill head 200.

On the rear of the oral care refill head 200 illustrated in FIG. 5, the support portion 230 is located between the elastomeric pad 270 and the elastomeric prophy cup 240. During manufacture of the oral care refill head 200, the main body 201 of the sleeve portion 210 and the support portion 230 of the head 220 are formed first. Next, in a single shot, the elastomeric material is injection molded onto the main body 201 and the support portion 230 to form the elastomeric prophy cup 240, the elastomeric post 280, the elastomeric pad 270, and the elastomeric component 202 (including the first and second portions 203, 204 thereof). The elastomeric material extends through the head 220 via the through hole 235 in the support portion 230.

The elastomeric cup portion 250 of the elastomeric prophy cup 240 comprises an upstanding wall 251 having an inner surface 252 and an outer surface 253. In the exemplified embodiment, the upstanding wall 251 of the elastomeric cup portion 250 is a continuous wall that circumscribes the prophy cup axis C-C. The outer surface 253 of the upstanding wall 251 of the elastomeric cup portion 250 is flush with the outer surface 262 of the elastomeric base portion 260. Thus, neither of the elastomeric cup portion 250 or the elastomeric base portion 260 protrudes radially beyond the other. Stated another way, in the exemplified embodiment the elastomeric cup portion 250 and the elastomeric base portion 260 have the same diameter. In fact, in the exemplified embodiment, the elastomeric cup portion 250, the elastomeric base portion 260 and the support portion 230 of the head portion 220 have a constant diameter (at least at the interfaces of those components) such that the transitions between the elastomeric cup portion, the elastomeric base portion 260, and the support portion 230 are smooth. Thus, there is no increase or decrease in diameter at the transition from the elastomeric cup portion 250 to the elastomeric base portion 260 or from the elastomeric base portion 260 to the support portion 230. Furthermore, the elastomeric base portion 260 and the elastomeric cup portion 250 have an identical diameter along their entire length (the length being along the prophy cup axis C-C).

The inner surface 252 of the upstanding wall 251 defines a prophy cavity 254 that extends along a prophy cup axis C-C. In the exemplified embodiment, the prophy cup axis C-C forms an obtuse angle with the sleeve axis B-B (best shown in FIGS. 6 and 7). The obtuse angle is formed between the sleeve axis B-B and a portion of the prophy cup axis C-C extending from the sleeve axis B-B towards the elastomeric prophy cup 240.

The elastomeric cup portion 250 further comprises a plurality of ribs 256 extending radially inward from the inner surface 252 of the upstanding wall 251 towards the prophy cup axis C-C. In the exemplified embodiment, there are five of the ribs 256 protruding radially inward from the inner surface 252 of the upstanding wall 251. Of course, more or less than five ribs 256 may be included in other embodiments. In the exemplified embodiment, the ribs 256 are equidistantly circumferentially spaced apart from one another along the inner surface 252 of the upstanding wall 251. Furthermore, each of the ribs 256 extends from the inner surface 252 of the upstanding wall 251 to a distal edge 257 that is spaced apart from the prophy cup axis C-C. Thus, the distal edges 257 of the ribs 256 are spaced apart from one another.

The upstanding wall 251 of the elastomeric cup portion 250 terminates in an upper edge 258. Furthermore, each of the ribs 256 terminate in an upper edge 259. The upper edges 259 of the ribs 256 are axially offset from the upper edge 258 of the upstanding wall 251. Specifically, in the exemplified embodiment the upstanding wall 251 has a first height H1 measured from the front surface 221 of the head portion 220 to the upper edge 258 and each of the ribs 256 has a second height H2 measured from the front surface 221 of the head portion 220 to the respective upper edge 259. The first height H1 is greater than the second height H2. This forms a pocket in the upper region of the elastomeric cup portion 250 between the upper edges 259 of the ribs 256 and the upper edge 258 of the upstanding wall 251. Of course, alternative embodiments are possible where the second height H2 is the same as or greater than the first height H1.

In the embodiment described herein, the head portion 220 of the oral care refill head 200 is free of bristles. Thus, the elastomeric prophy cup 240 is the only cleaning element located on the head portion 220 of the oral care refill head 200. There are no filament bristles or the like located on or extending from the head portion 220 for cleaning the teeth and other oral cavity surfaces. In the exemplified embodiment, all cleaning, massaging, polishing, and the like is done by the elastomeric prophy cup 240 of the oral care refill head 200.

Figure 9A:
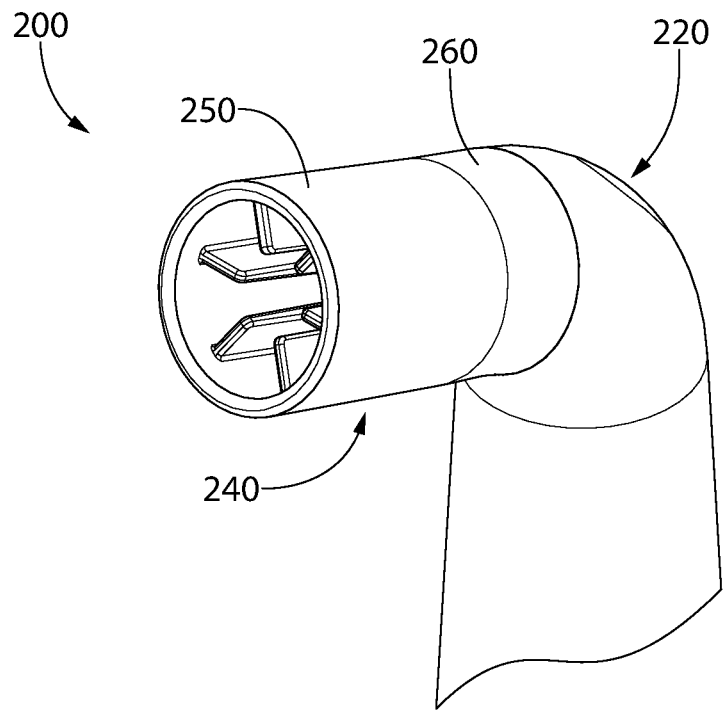
FIG. 9A is a close-up view of area IX of FIG. 1 with a vibration generating device of the oral care implement not activated.
Figure 9B:
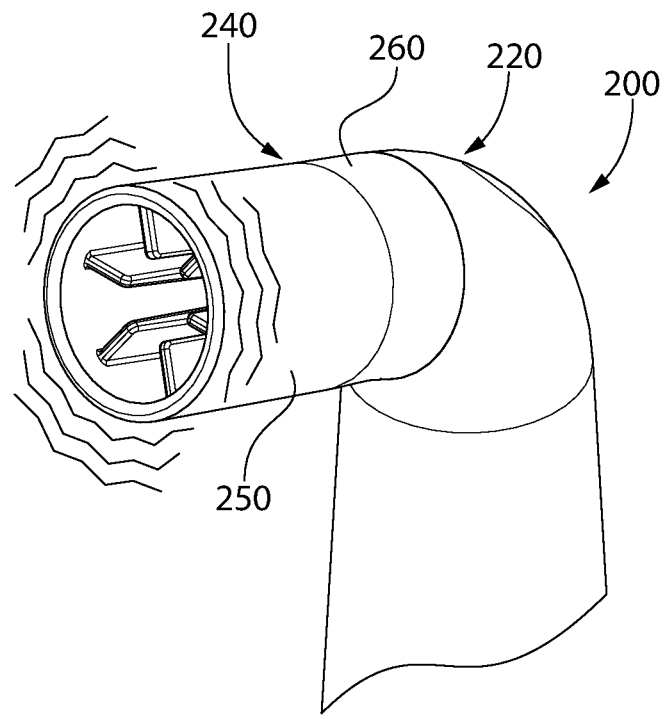
FIG. 9B is a close-up view of area IX of FIG. 1 with a vibration generating device of the oral care implement activated.

Referring to FIGS. 9A and 9B concurrently, close-up views of the head portion 220 of the oral care refill head 200 are illustrated. In FIG. 9A, the head portion 220 of the oral care refill head 200 is illustrated with the vibration generating element 199 (not illustrated in these figures, but refer to FIG. 3) deactivated or powered off. In FIG. 9B, the head portion 220 of the oral care refill head 200 is illustrated with the vibration generating element 199 activated or powered on. Thus, as can be seen, when the vibration generating element 199 is powered on, the elastomeric prophy cup 240, and more specifically the elastomeric cup portion 250 of the elastomeric prophy cup 240, vibrates. This vibration of the elastomeric prophy cup 240 might enable the oral care refill head 200 to achieve better cleaning/polishing results than when the vibration generating device 199 is not powered.

It should be noted that the elastomeric prophy cup 240 does not rotate, pivot, or oscillate relative to the support portion 230 of the oral care refill head 200. This is because the elastomeric prophy cup 240 is fixed to the support portion 230 of the oral care refill head 200 due to the elastomeric prophy cup 240 being injection molded onto the support portion 230 of the oral care refill head 200 as described herein. Rather, the elastomeric prophy cup 240 vibrates in a random manner due to the vibrations generated by the vibration generating device 199 (particularly due to the rotation of the eccentric 161).

Figure 10:
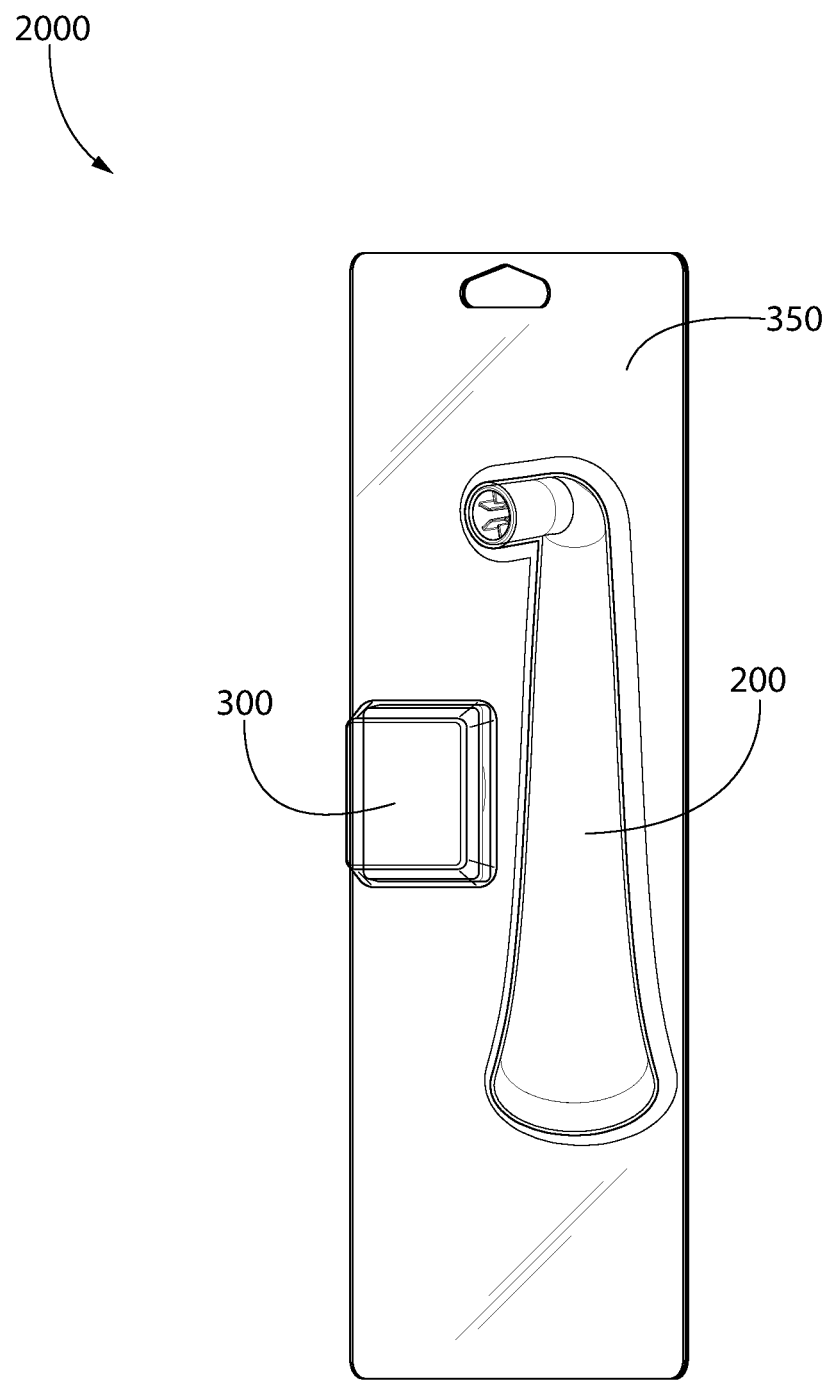
FIG. 10 illustrates an oral care kit comprising a package containing the oral care refill head of FIG. 1 and a store of an oral care material.

Referring to FIG. 10, a kit 2000 comprising the oral care refill head 200 and a store of an oral care agent 300 is illustrated. The oral care refill head 200 might be most effective when used with a particular type of oral care agent such that it might be desirable to make the oral care refill head 200 available for purchase by a consumer in the kit 2000 alongside the particular type of oral care agent. In certain embodiments, the oral care refill head 200 is most effective when being used to apply an anti-sensitivity agent to an oral cavity. Thus, the store of the oral care agent 300 may be a store of an anti-sensitivity oral care material. Such an anti-sensitivity oral care material may comprise, in some embodiments, arginine alone or in combination with calcium. In other embodiments, the store of the oral care agent 300 may be a store of a tooth whitening agent.

The anti-sensitivity oral care material may, in some embodiments, comprise arginine and calcium carbonate and/or potassium nitrate. Alternatively, the anti-sensitivity oral care material may be a stannous-based composition. Non-limiting examples of anti-sensitivity oral care materials that may be used in the kit 2000 are described in U.S. Patent Application Publication No. 2009/0186090, U.S. Pat. No. 6,592,853, and WO1993/025184, the entireties of which are incorporated herein by reference.

Any other suitable oral care material may be used in some embodiments of the present invention and, thus, included in the kit 2000 as the store of oral care material 300. Contemplated oral care materials include oral care agents that can be an active or non-active ingredient, including without limitation, antibacterial agents; oxidative or whitening agents; enamel strengthening or repair agents; tooth erosion preventing agents; anti-sensitivity ingredients, gum health actives; nutritional ingredients; tartar control or anti-stain ingredients; enzymes; sensate ingredients; flavors or flavor ingredients; breath freshening ingredients; oral malodor reducing agents; anti-attachment agents or sealants, diagnostic solutions, occluding agents; anti-inflammatory agents; dry mouth relief ingredients; catalysts to enhance the activity of any of these agents; colorants or aesthetic ingredients; and combinations thereof. The oral care material in one embodiment is free of (i.e., is not) toothpaste. Instead, the oral care material is intended to provide supplemental oral care benefits in addition to merely brushing one's teeth Other suitable fluids could include lip balm or other materials that are typically available in a semi-solid state.

The kit 2000 may also comprise a package 350 containing the oral care refill head 200 and the store of the oral care agent 300 (such as a store of an anti-sensitivity oral care material). The package 350 is illustrated as a blister-style package, but the invention is not to be so limited in all embodiments. Thus, the package 350 can be any type of package that is commonly seen in retail locations and that can contain various products for sale. For example, the package 350 might simply be an enclosed box having an inner cavity that contains the oral care refill head 200 and the oral care agent 300. Alternatively, the package 350 may be a stretch pack, a corrugated box, a plastic packet or pouch, a bag, or any other type of package.

By selling the kit 2000 as a single unit, a consumer can purchase the oral care refill head 200 to replace an oral care refill head that requires replacement along with a store of an anti-sensitivity oral care material (or some other oral care agent as may be desired). Thus, the consumer will understand that the oral care refill head 200 of the kit 2000 is most suitable for being used to apply the store of the oral care material 300 that is sold in the kit 2000 along with the oral care refill head 200.

Figure 11:
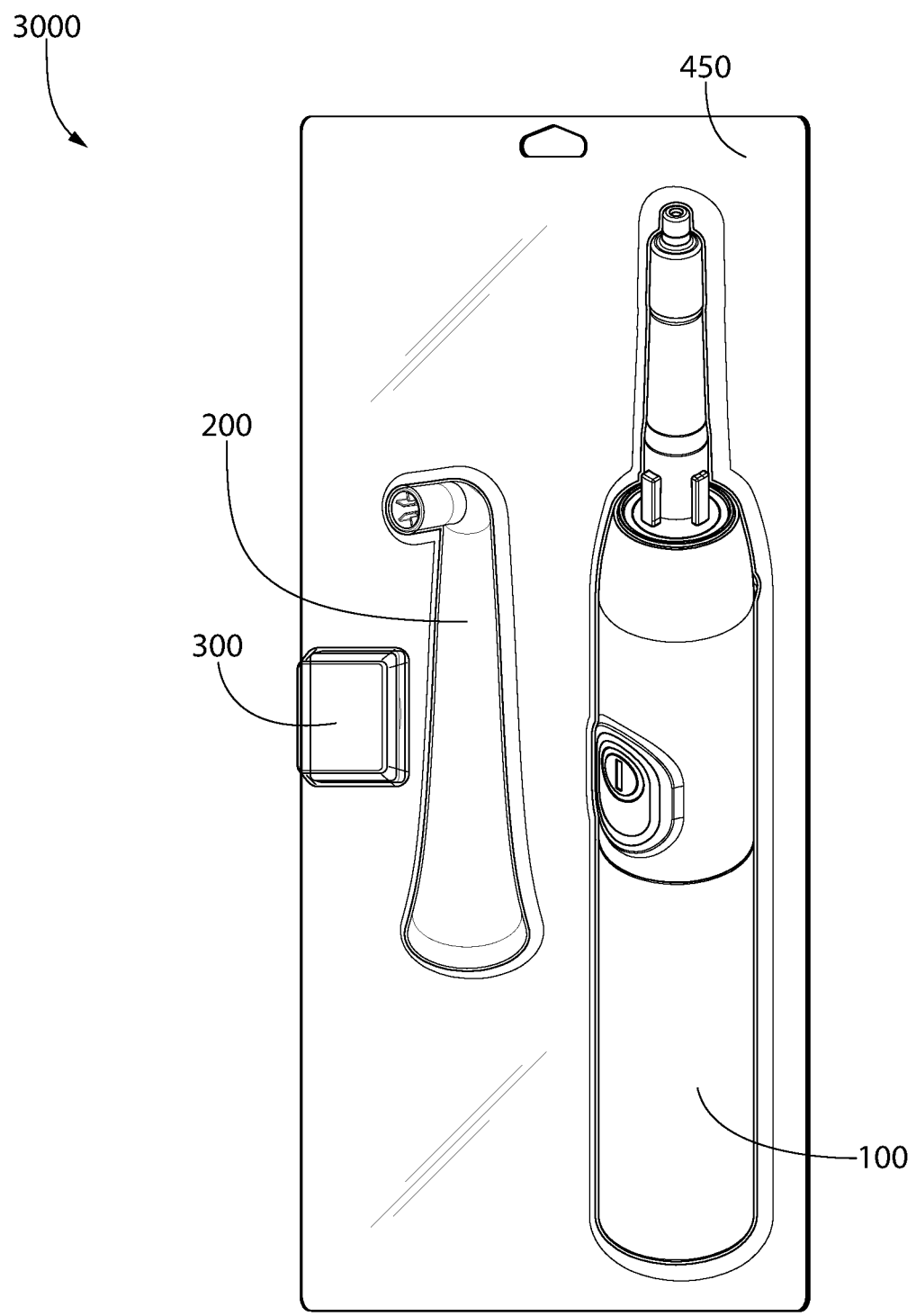
FIG. 11 illustrates an oral care kit comprising a package containing the oral care implement handle and the oral care refill head of FIG. 1 and a store of an oral care material.

FIG. 11 illustrates another embodiment of a kit 3000 that comprises a package 450 containing the oral care refill head 200, the store of the oral care material 300, and the oral care implement handle 100. Thus, the entire oral care implement 1000 can be purchased (i.e., the oral care implement handle 100 and at least one oral care refill head 200) along with the store of the oral care material 300 that is desired to be applied to the oral cavity using the oral care implement 1000. The details of the oral care refill head 200 and the oral care implement handle 100 provided above are applicable for the kits 2000, 3000.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care kit comprising:
an oral care refill head comprising:
a sleeve portion configured to be detachably coupled to an oral care implement handle;
a head portion at a distal end of the sleeve portion; and
an elastomeric prophy cup on the head portion, the elastomeric prophy cup comprising an elastomeric cup portion, the elastomeric cup portion comprising an upstanding wall having an inner surface defining a prophy cavity, an upper edge, and a plurality of ribs extending radially inward from the inner surface of the upstanding wall, each of the plurality of ribs terminating in an upper edge that is axially offset and parallel to the upper edge of the upstanding wall;
a store of an anti-sensitivity oral care material; and
a package containing the oral care refill head and the store of the anti-sensitivity oral care material;
wherein the head portion comprises a support portion formed of a hard plastic and an elastomeric pad that forms at least a portion of a rear surface of the head portion, the support portion comprising a through hole, the elastomeric pad integrally connected to the elastomeric prophy cup by an elastomeric post extending through the through hole, the elastomeric cup portion, the elastomeric pad, and the elastomeric post are formed from a single unitary mass of elastomeric material.

2. The oral care kit according to claim 1 wherein the sleeve portion of the oral care refill head extends from a proximal end to a distal end, the sleeve portion comprising an inner surface that defines an internal cavity that extends along a sleeve axis from an open bottom end at the proximal end of the sleeve portion to a closed top end, the internal cavity configured to receive an attachment portion of a stem of an oral care implement handle.

3. The oral care kit according to claim 1 wherein the elastomeric cup portion extends along a prophy cup axis, the sleeve portion extends along a sleeve axis, and the prophy cup axis forms an obtuse angle with the sleeve axis.

4. The oral care kit according to claim 1 wherein the head portion is free of bristles and the elastomeric prophy cup comprises an outer surface that forms a first portion of a peripheral side surface of the head portion that circumscribes the head portion.

5. The oral care kit according to claim 1 wherein the oral care implement handle comprises a vibration generating device, and wherein the package also contains the oral care implement handle.

6. The oral care kit according to claim 1 wherein the elastomeric cup portion extends along a prophy cup axis, and the upstanding wall of the elastomeric cup portion comprises an outer surface that is a constant radial distance from the prophy cup axis.

7. The oral care kit according to claim 1 wherein the plurality of ribs comprises at least five ribs.

8. The oral care kit according to claim 1 wherein the upstanding wall of the elastomeric cup portion extends parallel to a prophy cup axis and is a continuous, cylindrical wall that circumscribes the prophy cup axis.

9. The oral care kit according to claim 1 wherein each of the plurality of ribs extends from the inner surface of the upstanding wall to a distal edge that is perpendicular to the upper edge of the upstanding wall.

10. The oral care kit according to claim 1 wherein the head portion comprises a front surface, the upstanding wall having a first height measured from the front surface of the head to the upper edge of the upstanding wall, and each of the plurality of ribs having a second height measured from the front surface of the head to the upper edge of the rib, and first height being greater than the second height.

11. The oral care kit according to claim 1 wherein the upper edge of the upstanding wall lies in first reference plane, each of the upper edges of each of the plurality of ribs lies in a second reference plane, and the first reference plane is parallel with the second reference plane.

12. An oral care kit comprising:
a handle comprising a vibration generating device;
an oral care refill head comprising:
a sleeve portion configured to be detachably coupled to the oral care implement handle; and
a head portion comprising a support portion and an elastomeric prophy cup, the elastomeric prophy cup extending from the support portion;
a store of an oral care material; and
a package containing the handle, the oral care refill head, and the store of the oral care material;
wherein the elastomeric prophy cup is fixed to the support portion such that the elastomeric prophy cup does not rotate, pivot, or oscillate relative to the support portion; and
wherein the head portion further comprises an elastomeric pad that forms at least a portion of a rear surface of the head portion, the support portion comprising a through hole, the elastomeric pad integrally connected to the elastomeric prophy cup by an elastomeric post extending through the through hole.

13. The oral care kit according to claim 12 wherein the store of the oral care material is selected from the group consisting of an anti-sensitivity oral care material and a tooth whitening oral care material.

14. The oral care kit according to claim 12 wherein the sleeve portion extends from a proximal end to a distal end along a sleeve axis and comprises a main body formed of a rigid material and an elastomeric component, the elastomeric component comprising a first portion located adjacent to the proximal end of the sleeve portion and a second portion extending from the first portion to the head portion of the refill head.

15. The oral care kit according to claim 14 wherein the first portion of the elastomeric component is an annular portion that circumferentially surrounds a lower portion of the sleeve portion, and the second portion of the elastomeric component is elongated along the sleeve axis from the first portion of the elastomeric component to the head portion.

16. The oral care kit according to claim 12 wherein the support portion has an outer surface, and the elastomeric prophy cup comprises an elastomeric base portion having an outer surface, the elastomeric base portion being adjacent to the support portion and the outer surface of the elastomeric base portion being flush with the outer surface of the support portion.

17. The oral care kit according to claim 12 wherein the elastomeric prophy cup comprises an elastomeric cup portion, the elastomeric cup portion comprising an upstanding wall having an inner surface defining a prophy cavity, an upper edge, and a plurality of ribs extending radially inward from the inner surface of the upstanding wall, each of the plurality of ribs terminating in an upper edge that is axially offset and parallel to the upper edge of the upstanding wall.

18. The oral care kit according to claim 17 wherein each of the plurality of ribs extends from the inner surface of the upstanding wall to a distal edge that is perpendicular to the upper edge of the upstanding wall.

* * * * *